May 20, 1958  A. DORAZIO, JR  2,835,032

INDEXING ATTACHMENT FOR CUTTING DEVICES

Filed April 18, 1957

INVENTOR
ALTON DORAZIO, JR.

BY *Francis E. Blake*

ATTORNEY

United States Patent Office 2,835,032
Patented May 20, 1958

2,835,032
INDEXING ATTACHMENT FOR CUTTING DEVICES

Alton Dorazio, Jr., East Rochester, N. Y., assignor to General Dynamics Corporation, Rochester, N. Y., a corporation of Delaware Application April 18, 1957, Serial No. 653,569

3 Claims. (Cl. 30—179)

The present invention relates to a stock indexing attachment for use in connection with cutting devices.

There are numerous occasions which require that many pieces of stock be cut to equal lengths or that certain associated pieces of stock be cut to relative lengths. To provide increased accuracy in these operations, it is important that an economical method be employed for quickly measuring each length.

For the purpose of illustrating this invention, but in no way intending or inferring that the scope of the invention be limited or restricted thereto, an example of a requirement whereby it is desirable to cut pieces of associated stock to relative lengths is in connection with electronic circuit components. For instance, assuming that it is desirable to sleeve electronic component leads, prior to incorporating them in a circuit, it may be a necessary requirement that the component leads be cut to a certain length and that the associated sleeving be cut to a length relatively shorter than the lead lengths so as to provide a short section of bare lead extending beyond the sleeving for soldering.

It is an object of this invention to provide an improved indexing attachment for cutting means whereby a plurality of pieces of selected stock may be cut to equal lengths.

It is another object of this invention to provide an improved indexing attachment for cutting means whereby selected associated pieces of different stock may be cut to relative lengths.

In accordance with this invention, a hand tool or the like is provided with an indexing attachment having a supporting bracket and an adjustable indexing stop or stops.

For a better understanding of the present invention, together with further objects, advantages, and features thereof, reference is made to the following description and accompanying drawings in which like characters of reference indicate like parts in the several views, and:

While the present description is in reference to an application of the invention to cutting electronic circuit component leads and their respective sleeving to relative lengths, it is to be understood that the principles of this invention may be used with any cutting device or may be used to cut many pieces of stock to a single specific length.

Figure 1:
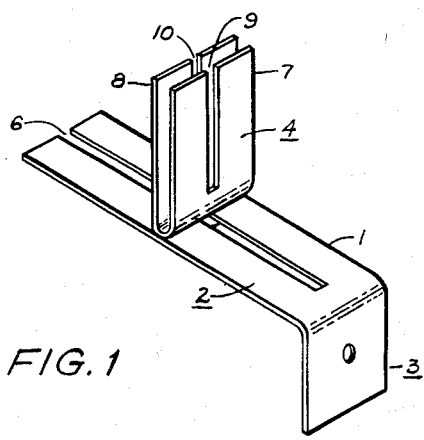
Figure 1 is a perspective view of the novel indexing attachment.

In Figure 1, a supporting member is indicated by the numeral 1. This supporting member is made up of two parts, a base portion 2 having a longitudinal slot 6 extending along its length, and an attaching portion 3. The attaching portion 3 is shown, in this instance, to be extending from the base portion 2 in a lateral plane. As the attaching portion 2 is for the purpose of mounting the attachment, it may be in any position, relative to the base portion 2, which will facilitate securing the attachment to any specific cutting device.

An indexing stop member 4 extends from the base portion 2 in a second lateral plane which may be either normal to that of base portion 2, as indicated, or at any other convenient angle as the application may dictate. Indexing stop member 4 is adjustably fastened to base portion 2 through a thumb screw arrangement 5 which extends through longitudinal slot 6 so that the indexing stop member 4 may occupy a plurality of selected positions longitudinally along slot 6 and base portion 2. It is to be understood that the thumb screw arrangement for adjustably fastening indexing stop member 4 to base portion 2 is for illustration only, as numerous other methods for obtaining this feature will be obvious to those skilled in the art. As will be apparent later in this specification, the specific application selected to illustrate one embodiment of this invention permits indexing stop member 4 to be of a single piece construction, having a pair of stop faces indicated at 7 and 8 and requires that stop faces 7 and 8 be provided with longitudinal slots 9 and 10 to permit the admission of stock to the cutting edge 12 of hand cutting tool 11. It is to be specifically understood that other operations may permit or even require that the indexing stop member 4 be of two-piece construction permitting stop faces 7 and 8 to be individually adjusted relative to each other and that the longitudinal slots 9 and 10 may be omitted from either or both stop faces 7 and 8 without departing from the principles of this invention.

Figure 3:
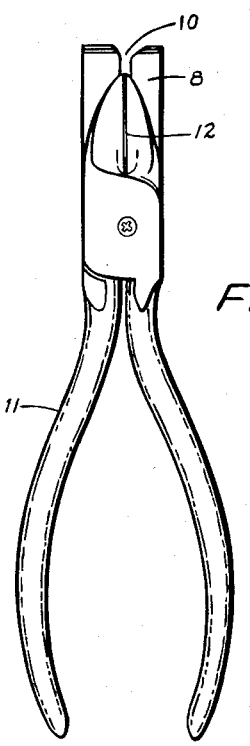
Figure 3 is a front view of Figure 2.
Figure 2:
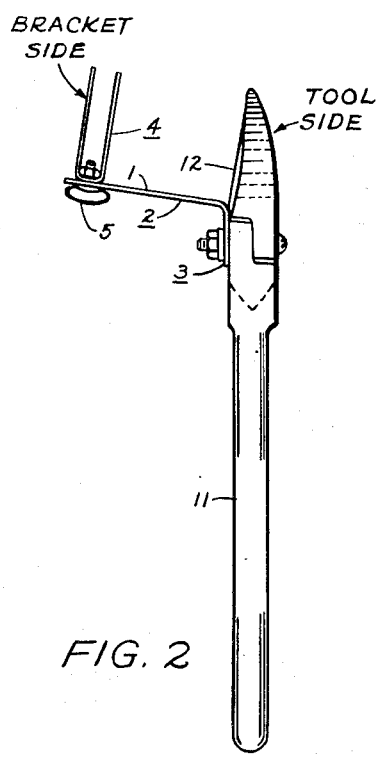
Figure 2 is a side view of a suggested application of the invention in regard to a diagonal hand cutter.

For the purpose of illustrating one embodiment of this invention, Figure 2 shows the attachment mounted upon a hand cutting tool 11. Assuming that it is desired to cut electronic circuit component leads to a specific length and that these leads are to be sleeved for insulation purposes, the indexing stop member 4 is longitudinally adjusted along the base portion 2, in relation to the cutting edge 12 of tool 11, until the distance between the bracket side of stop face 7 and the cutting edge 12 of hand tool 11 is equal to the required lead length. When the indexing member 4 is firmly secured in this position along base portion 2 by tightening thumb screw attachment 5, the required lead length is thereby indexed in relation to the cutting edge 12 of hand tool 11 and a plurality of leads may be cut to equal lengths. By holding the component against the outside of indexing stop 4 and inserting the lead through slots 9 and 10 in the stop faces 7 and 8 and through the cutting blades of tool 11, the component lead may be cut to a specific length.

By inserting the sleeving over the cut lead from the tool side and adjusting its free end firmly against the tool side of indexing stop face 8, it is apparent that the sleeving is cut relatively shorter than the component lead by an amount equal to the distance between stop faces 7 and 8. Similarly, this cutting may be performed in one operation by the simple expedient of inserting the component lead on the bracket side, adjusting the sleeving around the lead from the other side and cutting both simultaneously.

While I have shown and described a preferred embodiment of my invention, it will be obvious to those skilled in the art that various modifications and substitutions may be made without departing from the spirit of this invention which is to be limited only within the scope of the appended claims. For example, the longitudinal slots 9 and 10 may be replaced by any satisfactory openings in stop faces 7 and 8 including holes having a diameter not greater than the corresponding slot widths as previously described.

I claim:

1. A hand cutting device attachment which provides indexing stops for cutting a first piece of stock to a desired length and a second piece of stock to a relative length comprising, a supporting bracket having a base portion and an attaching portion, an indexing stop member, said attaching portion extending in a first plane lateral to said base portion, said indexing stop member extending in a second plane lateral to said base portion, a plurality of aligned spaced index stops attendant with said stop member, slot means in said indexing stop member for admitting said first piece of stock to be cut, and means for adjustably fastening said indexing stop member along said longitudinal slot in said base portion.

2. A hand cutting device attachment which provides indexing stops for cutting a first piece of stock to a desired length and a second piece of stock to a relative length comprising, a strap metal supporting bracket having a base portion extending in a plane parallel to the direction of the stock to be cut and an attaching portion, a longitudinal slot extending along said base portion, an indexing stop member, said attaching portion extending in a first plane lateral to said base portion, means for securing said attaching portion to the said hand cutting device, said indexing stop member extending in a second plane lateral to said base portion, a plurality of index stops attendant with said stop member, slot means in said stop member for admitting said first piece of stock to be cut, and means for adjustably fastening said stop member along said longitudinal slot in said base portion.

3. A hand cutting device attachment which provides indexing stops for cutting a first piece of stock to a desired length and a second piece of stock to a relative length comprising, a strap metal supporting bracket having a base portion extending in a plane parallel to the direction of the stock to be cut and an attaching portion, a longitudinal slot extending along said base portion, an indexing stop member, said attaching portion extending in a first plane lateral to said base portion, means for securing said attaching portion to the said hand cutting device, said indexing stop member extending in a second plane lateral to said base portion, a plurality of index stop faces attendant with said stop member, slot means in said stop faces for admitting said first piece of stock to be cut, and means for adjustably fastening said stop member along said longitudinal slot in said base portion.

References Cited in the file of this patent

UNITED STATES PATENTS

| | | |
|---|---|---|
| 13,570 | Grover | Sept. 18, 1855 |
| 178,093 | Wiggins | May 30, 1876 |
| 464,750 | Campbell | Dec. 8, 1891 |
| 508,453 | Waldie | Nov. 14, 1893 |
| 598,031 | Stein | Jan. 25, 1898 |
| 1,042,901 | Fletcher | Oct. 29, 1912 |
| 1,962,624 | Taylor | June 12, 1934 |